(12) United States Patent
Gunsay

(10) Patent No.: US 10,018,494 B2
(45) Date of Patent: Jul. 10, 2018

(54) TEMPERATURE COMPENSATED TRANSMISSION LINE BASED LIQUID LEVEL SENSING APPARATUS AND METHOD

(71) Applicant: Metin A. Gunsay, Bluffdale, UT (US)

(72) Inventor: Metin A. Gunsay, Bluffdale, UT (US)

( * ) Notice: Subject to any disclaimer, the term of this patent is extended or adjusted under 35 U.S.C. 154(b) by 4 days.

(21) Appl. No.: 14/709,212

(22) Filed: May 11, 2015

(65) Prior Publication Data

US 2015/0323372 A1 Nov. 12, 2015

Related U.S. Application Data

(60) Provisional application No. 61/991,664, filed on May 12, 2014.

(51) Int. Cl.
*G01F 23/26* (2006.01)

(52) U.S. Cl.
CPC ............ *G01F 23/266* (2013.01); *G01F 23/26* (2013.01)

(58) Field of Classification Search
CPC ............................... G01F 23/26; G01F 23/266
See application file for complete search history.

(56) References Cited

U.S. PATENT DOCUMENTS

| | | |
|---|---|---|
| 3,391,547 A | 7/1968 | Kingston |
| 3,864,974 A | 2/1975 | Rauchwerger |
| 3,874,237 A | 4/1975 | Zwarts |
| 3,916,213 A | 10/1975 | Lateran |
| 3,995,212 A | 11/1976 | Ross |
| 4,137,527 A | 1/1979 | Tennenhouse et al. |
| 4,276,454 A | 1/1981 | Zathan |
| 4,373,389 A | 2/1983 | Decker |
| 4,800,755 A | 1/1989 | Fathauer et al. |
| 5,017,909 A | 5/1991 | Goekler |
| 5,097,703 A | 3/1992 | Peter |
| 5,365,783 A | 11/1994 | Zweifel |
| 5,610,611 A | 3/1997 | McEwan |
| 5,719,556 A | 2/1998 | Albin et al. |
| 6,016,697 A * | 1/2000 | McCulloch ........... G01F 23/266 73/304 C |

(Continued)

FOREIGN PATENT DOCUMENTS

| | | |
|---|---|---|
| WO | WO 2008/090157 A1 | 7/2008 |
| WO | WO 2009/073876 A1 | 6/2009 |
| WO | WO 2012/032318 A1 | 3/2012 |

*Primary Examiner* — Ryan Walsh
(74) *Attorney, Agent, or Firm* — Geoffrey E. Dobbin; Dobbin IP Law P.C.

(57) ABSTRACT

A sensor having a transmission line acting as a probe and an electronic circuit measures liquid levels. The sensor circuit uses a periodic signal generator to produce a carrier wave, which stimulates the transmission line, through a complex network coupling element. The complex impedance network forms a voltage divider with the transmission line, wherein the output of the voltage divider, is demodulated with an AM demodulator, such as a thermally compensated peak detector. This demodulated signal is related to the dielectric constant, and thus the liquid level of the material surrounding the partially submerged transmission line probe. The liquid level and the demodulated signal may be offset, scaled and linearized with a microcontroller containing signal processing routines, linearizing equations, stored calibration constants and look up tables.

9 Claims, 1 Drawing Sheet

(56) References Cited

U.S. PATENT DOCUMENTS

| | | | |
|---|---|---|---|
| 6,028,521 A | 2/2000 | Issachar | |
| 6,138,508 A | 10/2000 | Hannan et al. | |
| 6,192,752 B1 | 2/2001 | Blaine | |
| 6,457,355 B1 | 10/2002 | Philipp | |
| 6,644,114 B1 * | 11/2003 | McEwan | G01F 23/284 73/290 R |
| 7,150,190 B2 | 12/2006 | Krufka et al. | |
| 7,509,856 B1 | 3/2009 | Winkens et al. | |
| 7,634,945 B2 * | 12/2009 | Champion | G01F 23/284 73/291 |
| 7,823,447 B2 | 11/2010 | Harazin et al. | |
| 7,992,437 B2 | 8/2011 | Tshishiku | |
| 8,576,085 B2 | 11/2013 | Kessinger | |
| 2008/0211521 A1 * | 9/2008 | Lock | G01N 27/048 324/696 |
| 2009/0134889 A1 * | 5/2009 | Gunsay | A01G 25/167 324/694 |
| 2009/0148306 A1 | 6/2009 | Drechsel et al. | |
| 2011/0270542 A1 | 11/2011 | Chappell et al. | |
| 2012/0268139 A1 * | 10/2012 | Fend | G01F 23/24 324/601 |
| 2013/0233072 A1 | 9/2013 | Milone | |

* cited by examiner

TEMPERATURE COMPENSATED TRANSMISSION LINE BASED LIQUID LEVEL SENSING APPARATUS AND METHOD

CROSS-REFERENCES TO RELATED APPLICATIONS

This application claims priority as a non-provisional perfection of prior filed application No. 61/991,994, filed May 12, 2014, and incorporates the same by reference herein in its entirety.

FIELD OF INVENTION

This invention generally relates to liquid level sensing, and in particular to an apparatus used to measure the level of liquid in a system

BACKGROUND OF THE INVENTION

The sensing and measuring of liquid levels is essential in many applications. For example, and without limitation, many water reservoirs need water level to be monitored so that they can be refilled, or to prevent overflow and flooding. Also, environmental sensing of water level in rivers, oceans, and lakes is becoming increasingly more important with climate change, and as demand for water resources increases.

Many methods and devices for measuring liquid levels have been used. The most common is the mechanical float, which consists of buoyant floats coupled with water valves, electronic switches, rotary sensors, or magnets and magnetic sensors that capture position level as the float moves up and down. The problem with these types of measuring devices is that they are mechanical and have moving parts which may break or deteriorate over time and with use, are bulky and such devices which measure a continuum of levels are often very expensive.

Resistive sensors (see, U.S. Pat. No. 4,137,527; U.S. Pat. No. 4,276,454; U.S. Pat. No. 7,992,437; U.S. Pat. No. 5,719,556; U.S. Pat. No. 3,916,213), which consist of conductive probes inserted into a conductive liquid are often used, but they suffer from corrosion and can cause electrolysis when used in water. They are also sensitive to salinity and can ignite combustible liquids.

Another common technology is capacitive sensors. These sensors primarily consist of one or more plates arranged in various geometries and shapes. The plates can be oriented inside or outside a reservoir. They can consist of parallel plates or concentric tubes (see, U.S. Pat. No. 4,924,702). Some use multiple staggered plates (see US 2009/0148306 A1). Liquids tend to have a higher dielectric constant than air or gasses. Water in particular has a very high dielectric constant of 80, and is easily measured with dielectric techniques. When liquid level changes across a capacitive plate, the capacitance changes proportionally. Each of these capacitive sensors employ many different methods of electronically determining the capacitance changes of the plates, and thus the liquid level. The disadvantage of this type of sensor is that large plates are difficult and expensive to produce so measuring large ranges of water level becomes prohibitively expensive.

Yet another less common but sophisticated technique, known as TDR, uses transmission lines to measure the time delay of pulse reflections from the liquid to air boundary (see, U.S. Pat. No. 3,995,212; U.S. Pat. No. 5,610,611). While the length of the sensor is unbounded, the electronics employed to measure the time delay of reflected pulses is often prohibitively expensive.

In view of the foregoing, there is a need to provide a level sensing apparatus and method, which is inexpensive to manufacture, easy to use, measures a wide range of liquid levels, and is easy to calibrate.

SUMMARY OF THE INVENTION

In view of the foregoing disadvantages inherent in the known types of liquid level sensing apparatuses and methods, this invention provides an improved liquid level sensor. As such, the present invention's general purpose is to provide a new and improved liquid level sensor that is inexpensive to manufacture, easy to employ and calibrate, and provides reliable data.

One embodiment of a liquid level sensor that accomplishes these purposes comprises a periodic signal generator, a coupled transmission line probe, a temperature compensated peak detector circuit with differential amplifier, microcontroller with ADC and stored calibration coefficients, and calibration buttons.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views. Several objects and advantages of the invention are:

(a) to reduce cost and size of the sensor electronics by use of a temperature compensated peak detector circuit as an AM demodulator;

(b) to increase the fluid measurement range with the use of arbitrarily long transmission lines;

(c) to reduce the cost of the sensor probe by use of off the shelf transmission line cable;

(d) to easily change and replace worn transmission line sensing elements and recalibrate sensor elements for the different lengths of transmission line.

Still further objects and advantages will become apparent from a consideration of the ensuing description and drawings.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the

Figure 1:
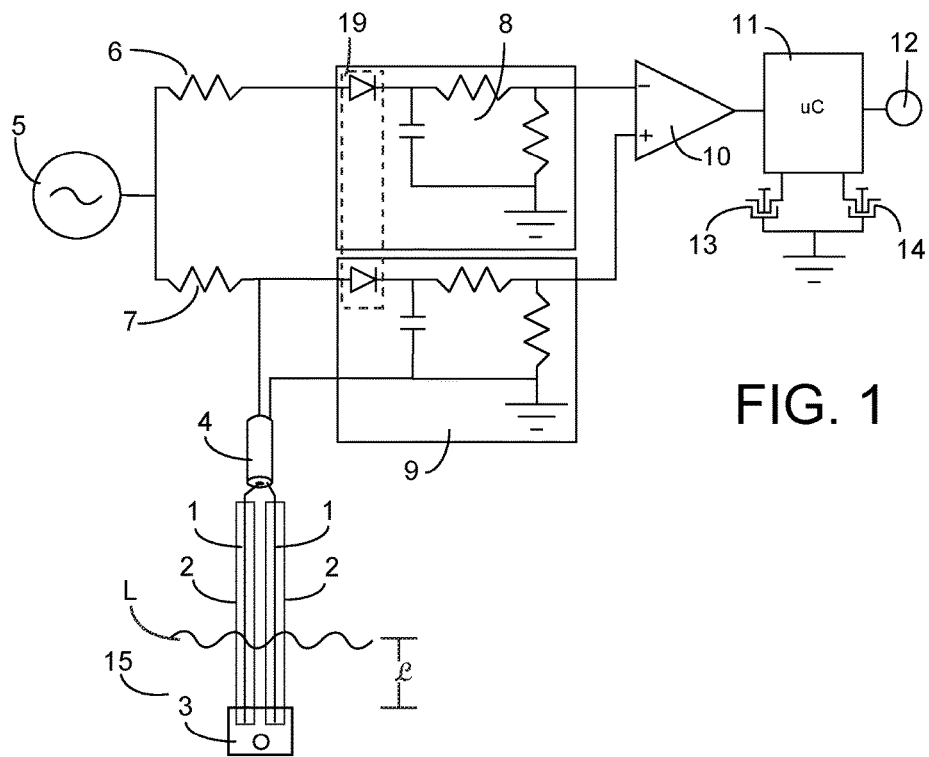
FIG. 1 is a circuit diagram of one embodiment of a liquid level sensor.

DRAWINGS—REFERENCE NUMERALS 1 transmission line probe;
2 insulation around wires;
3 weight/clamp;
4 transmission line to probe;
5 periodic voltage function generator;
6 complex impedance network;
7 complex impedance network;
8 reference peak detector;
9 probe signal peak detector;
10 differential amplifier;
11 microcontroller;
12 output signal;
13 calibration push button;
14 calibration push button;
15 target liquid whose level is being measured;
16 casing;
17 electronic readout;
18 power supply;
19 thermo-coupling structure;
L liquid level;
$\mathcal{L}$ length of transmission line probe submerged in liquid.

DETAILED DESCRIPTION OF THE PREFERRED EMBODIMENT

A block diagram of the preferred embodiment is shown in FIG. 1. A periodic function generator 5 provides a carrier frequency through a resistive or complex impedance network 7 to a transmission line probe 1 of one or more segments, which is partially submerged in a target liquid 15. The complex impedance network 7 with the transmission line 4, form a voltage divider whose output voltage magnitude is related to the impedance of the transmission line probe 1. The magnitude of the voltage divided signal will vary according to the dielectric constant of the liquid and the level of liquid L surrounding the partially submersed transmission line probe. In the Figures, liquid level L is the illustrated air-liquid boundary, and would be consistent with the relative height of the liquid in a container, and $\mathcal{L}$ represents the length of the transmission line probe 1 submerged within the liquid. The output of this voltage divider is fed to an AM (Amplitude Modulated) demodulator, typically a peak detector 9, for the purpose of removing the carrier, and rendering a voltage which is related to the level of liquid surrounding the transmission line probe. One skilled in the art of electronics will recognize that any AM demodulation circuit could be used in place of the peak detector circuit illustrated, including diode configured transistors.

Because diodes are temperature sensitive, temperature compensation is needed for environments where temperature may fluctuate, thus a second peak detector 8 is used as a temperature reference, and is fed by the same oscillator through a complex impedance network 6, normally identical in form to the other complex impedance network 7. The diodes in both peak detectors are typically thermally coupled 19, as shown schematically in the FIG. 1, and located together in a diode array package. The signal from the reference peak detector cancels out the temperature fluctuations of the probe peak detector, by means of the differential amplifier 10, as the temperature fluctuations are common mode and rejected by the differential amplifier 10.

The signal generator 5 may produce any periodic carrier frequency of sufficient frequency to stimulate the transmission line. Many data electronic recording systems and microcontrollers already have numerous oscillators or clock sources which can be used for this purpose. It is well known by those skilled in the art of electronics that all periodic waves can be band pass filtered or low pass filtered if the desired frequency is the fundamental frequency of the waveform, to produce a single frequency carrier.

It is well known that the reactance of transmission lines alternates, as the transmission line length increases, between negative and positive values every quarter wavelength of the carrier frequency. For example, a transmission line with an open circuit load has a negative reactance and looks capacitive when the length of the line is less than a quarter wavelength of the carrier, and a positive reactance from above a quarter wavelength to below one half a wave length, and so on. The even quarter wavelength nodes are resonance points. Thus, in practice the carrier and the length of the transmission line are selected such that the reactance does not change polarity over the range of possible liquid levels. For example, the length of an open load transmission line could be chosen to be less than one quarter of a wavelength such that the reactance is negative. For applications where it is desired that the length of the transmission line be maximized, a lower carrier frequency should be used.

Figure 2:
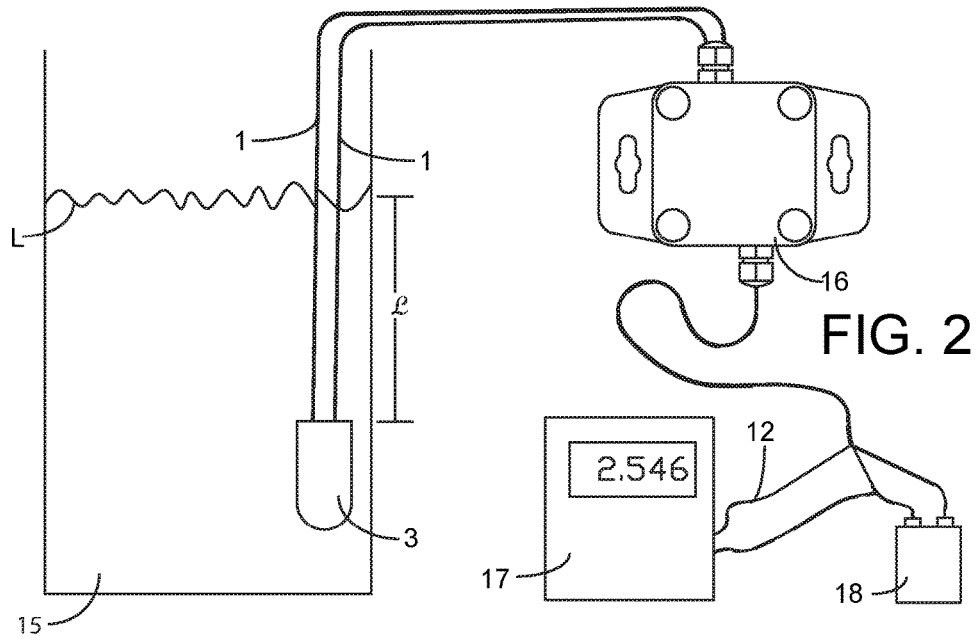
FIG. 2 is a schematic drawing of the liquid level sensor of FIG. 1.

The transmission line probe can consist of any pair of insulated wires 2 with the liquid submersed end sealed (insulation is not shown in FIG. 2 for clarity). Common twisted pair transmission line cable, or non-twisted parallel pair wire such as common speaker wire can be used. In addition, transmission lines created with printed circuit boards can also be used for rigid probes. When flexible cables are used for the probe, a clamp or weight, or a weighted clamp or fixable weight 3 is used to keep the cable taut in undulating liquid. The weight 3 may be bolted to the side of a reservoir. This clamp or weight 3 can also be used to seal the end of the transmission line if it is made of cut wire. A separate seal can also be used on the end of the submerged transmission line 1. Alternatively, a flexible transmission line can be braced with a rigid material so that it remains stationary in undulating liquid.

The complex impedance networks 6 and 7 will typically be composed of single resistors, but other reactive elements such as inductors or capacitors, or combinations thereof, in various topologies such as PI- and T-networks can be used. This network can have the secondary purposes of filtering the signal from the signal generator to remove unwanted harmonics, and matching the signal to the transmission line.

The output of the differential amplifier 10 can be digitized using various methods, including the use of an analog to digital converter (ADC). This digitized signal can be passed to a microcontroller 11 or computer system for further processing, such as averaging to remove noise and determination of the liquid level. The relationship between the voltage from the demodulator and the liquid level can be derived from a look-up table in the microcontroller 11 that contains known relationship values for voltage and liquid level or by applying an equation if the relationship can be described by an equation. Many microcontrollers have integrated ADCs and also differential amplifiers which can be used for the ADC and differential amplifier elements of circuit. If the temperature dependency of the dielectric is known, and the microcontroller 11 can access this through a secondary sensor, then the output signal may be compensated for this dependency through computations on the microcontroller 11.

The electrical system of the sensor (elements 5-11, 13 and 14) may be housed in a single casing 16 (FIG. 2) or may be housed in different units. Power for the circuitry may be provided by any means known, though a simple battery 18 may suffice in most applications.

The output 12 of the microcontroller 11 is a signal that represents the liquid level information and can be in analog, RF, digital or visual, or aural form. Common methods of producing analog outputs are via digital to analog converters or pulse width modulators. Other common digital outputs include I2C, SPI, 1-Wire, USB, etc. Likewise the output could be in the form of a visual display, or audible output. As can be seen in FIG. 2, the output 12 may be routed to a visual display 17, such as the depicted voltmeter, to display a reading. The output 12 may also be directly connected to a control apparatus, such as for a water source, to activate or deactivate when liquid reaches a given level. The sensor may be used in any fashion in which a sensor may be used in a larger system.

A multi-segment transmission line 4 which feeds the transmission line probe 1 may not be needed for all applications, but can be useful in applications where the transmission line probe 1 needs to be placed remotely away from the sensor electronics. Any suitable transmission line, including coaxial cable, may be used for the multi-segment transmission line 4.

Because liquid level range may vary as well as the type of liquid, according to the application of the device, a simple method to calibrate the device is needed. For example, the dielectric constant of fresh water, salt water and oil are different. Also the device may be used to measure only a few centimeters of change in liquid level, or alternatively in large tanks where liquid level may vary by many meters. One or more calibration buttons, 13, 14, when pressed, indicate to the microcontroller that it should store the voltage values from the differential amplifier corresponding to the minimum and maximum liquid level as calibration coefficients in the processor. Typically two buttons are used to calibrate: one button is used to record the minimum liquid level value, and the other the maximum liquid level value. The recorded calibration values are then used by the microcontroller to adjust the output of the sensor such that the output 12 is offset and scaled to give full range or other useful ranges.

In cases where the voltage output from the analog circuit is non-linear with liquid level, the microcontroller can linearize the signal by use of a look up table or transforming the signal through a linearizing signal processing function.

CONCLUSION, RAMIFICATIONS, AND SCOPE

Accordingly the reader will see that, the liquid level sensor of this invention uses low cost, low power electronics, uses low cost off the shelf transmission lines, can measure a wide range of liquid levels, is temperature compensated, and can be easily calibrated for a number of fluids and probe lengths.

While the above description contains many specificities, these should not be construed as limitations on the scope of the invention, but as exemplifications of the presently preferred embodiments thereof. Many other ramifications and variations are possible within the teachings of the invention. For example, a variety of the probe element types and geometries could be used. Thus the scope of the invention should be determined by the appended claims and their legal equivalents, and not by the examples given.

What is claimed is:

1. A sensor for measuring liquid level within a container, said liquid having a dielectric constant, the sensor comprising:
   a. a voltage signal generator which provides a carrier frequency;
   b. a dual line transmission line probe of at least one segment, the dual line transmission probe having a length that is submerged in the liquid with one input line coupled to a fixed potential, and another input line coupled to the signal generator through
   c. a complex impedance network; and
   d. an AM demodulator coupled to the complex impedance network;
   the AM demodulator providing an output voltage signal correlated to the liquid's dielectric constant and the length of the dual transmission line that is submerged in the liquid; wherein the said AM demodulator circuit is comprised of a temperature compensated peak detector circuit further comprising two simple peak detector circuits, each simple peak detector circuit still further comprising a diode that is thermally coupled to the diode of the other simple peak detector circuit and with an input of one simple peak detector coupled to the said transmission detector circuit coupled to the said signal generator through a second complex impedance network, and with outputs of both peak detectors coupled to inputs of a differential amplifier which subtracts the signals resulting in a the removal of common mode temperature fluctuations and an amplified result.

2. A sensor for measuring liquid level according to claim 1 wherein the said AM demodulator circuit is comprised of a peak detector circuit, further comprising of a diode with an anode that is connected to an input of the peak detector circuit, and a cathode that is coupled to an output of the peak detector circuit and to a resistor in parallel with a capacitor connected to a ground node of the circuit.

3. A sensor for measuring liquid level according to claim 1 wherein the said transmission line is of a flexible material, which is reinforced with a rigid elongated brace.

4. A sensor for measuring liquid level according to claim 1 wherein the said transmission line is comprised of traces on a circuit board, further with the circuit board comprising an electronic circuit.

5. A sensor for measuring liquid level according to claim 1 further comprising an analog to digital converter (ADC) which digitizes the output voltage signal, a microcontroller coupled to said ADC with numerical calibration coefficients and look-up table values stored in memory corresponding to one or more liquids of differing properties and corresponding to one or more transmission line probes of differing properties, and said microcontroller scaling, offsetting and linearizing the voltage into a numerical value representing fluid level.

6. A sensor for measuring liquid level according to claim 5 further comprising at least one button coupled to the microcontroller and used to trigger recording into the microcontroller memory of numerical calibration coefficients corresponding to the liquid level being minimum in relation to the probe, and the liquid level being maximum in relation to the probe.

7. A method of measuring liquid level in a container, comprising the steps of:
  a. providing a transmission line probe of at least one segment and partially submerging the transmission line probe into a liquid medium having a dielectric constant;
  b. providing a periodic voltage signal to an input of the transmission line probe through a complex impedance network;
  c. providing an AM demodulator coupled to the input of the transmission line probe; and,
  d. the demodulator providing a first output signal correlated to the dielectric constant of the liquid medium and a length of the transmission line probe wherein a signal from the probe is demodulated and thermally compensated by: e. providing a primary peak detector coupled to the said complex impedance network; f. providing a secondary complex impedance network coupled to the periodic voltage signal; g. providing a secondary peak detector coupled to the said secondary complex impedance network, the secondary peak detector providing a second output signal; h. thermally coupling two diodes of the primary and secondary peak detectors; i. subtracting the second signal from the first signal to remove common mode thermal fluctuations.

8. The method of claim 7, further comprising the steps of:
  a. providing an analog to digital converter for the purpose of converting the demodulated and thermally compensated voltage signal from the probe into a digital signal;
  b. providing a computer or microcontroller for processing the digital signal;
  c. providing stored calibration coefficients from a memory according to liquid types and to a length and a type of transmission line probe;
  d. processing the digital signal using the stored calibration coefficients to create a new digital signal which is linearized to liquid level and scaled to a desirable range.

9. The method of claim 7, further comprising the steps of:
  a. providing at least one push buttons coupled to the said microcontroller;
  b. pressing one of the at least one push buttons to store the digital value of the demodulated signal voltage as a calibration coefficient when the transmission line probe is minimally submersed;
  pressing one of the at least one buttons to store a digital value of the demodulated signal voltage in a memory as a calibration coefficient when the transmission line probe is maximally submersed.

\* \* \* \* \*